United States Patent
Wippler

(10) Patent No.: US 11,148,620 B2
(45) Date of Patent: Oct. 19, 2021

(54) VEHICLE RANGE MAXIMIZATION BASED ON EXTERNAL FACTORS

(71) Applicant: TOYOTA MOTOR ENGINEERING & MANUFACTURING NORTH AMERICA, INC., Plano, TX (US)

(72) Inventor: Erik Anthony Wippler, Canton, MI (US)

(73) Assignee: TOYOTA MOTOR ENGINEERING & MANUFACTURING NORTH AMERICA, INC., Plano, CA (US)

( * ) Notice: Subject to any disclaimer, the term of this patent is extended or adjusted under 35 U.S.C. 154(b) by 354 days.

(21) Appl. No.: 16/262,651

(22) Filed: Jan. 30, 2019

(65) Prior Publication Data

US 2020/0238929 A1  Jul. 30, 2020

(51) Int. Cl.
| | | |
|---|---|---|
| B60R 16/023 | (2006.01) | |
| B60C 23/04 | (2006.01) | |
| B60W 40/13 | (2012.01) | |
| B60W 10/18 | (2012.01) | |
| B60W 10/02 | (2006.01) | |

(Continued)

(52) U.S. Cl.
CPC .......... B60R 16/0236 (2013.01); B60C 23/04 (2013.01); B60W 10/02 (2013.01);
(Continued)

(58) Field of Classification Search
CPC ..... B60R 16/0236; B60C 23/02; B60C 23/04; B60W 40/10; B60W 40/1005; B60W 40/105; B60W 40/12; B60W 40/13; B60W 40/1307; B60W 10/02; B60W 10/04; B60W 10/06; B60W 10/08; B60W 10/18; B60W 10/184; B60W 10/22; B60W 50/14;
(Continued)

(56) References Cited

U.S. PATENT DOCUMENTS

| 5,578,748 A | 11/1996 | Brehob et al. |
|---|---|---|
| 8,145,376 B2 | 3/2012 | Sherony |
| 8,185,269 B2 * | 5/2012 | Li ................ G08G 1/096725 |
| | | 701/37 |

(Continued)

FOREIGN PATENT DOCUMENTS

| JP | 2013086613 A | * | 5/2013 | ....... G08G 1/096725 |
|---|---|---|---|---|
| KR | 20170143085 A | * | 12/2017 | ............ G10K 9/125 |
| SE | 539100 C2 | | 4/2017 | |

OTHER PUBLICATIONS

JP-2013086613-A EPO translation May 28, 2021 (Year: 2021).*
KR 20170143085 Bio Jun. 9, 2021 (Year: 2021).*

*Primary Examiner* — Kevin P Mahne
(74) *Attorney, Agent, or Firm* — Haynes and Boone, LLP

(57) ABSTRACT

A range maximization system for a vehicle accounting for external factors may include a tire pressure sensor and a load carry sensor configured to detect information relevant to a load on the vehicle. A vehicle control unit may be configured to receive detected information from the tire pressure and load carry sensor, and configured to determine a) an expected range for the vehicle with the detected information relevant to the load and the detected tire pressure, b) a contribution of the detected information relevant to the load and the detected tire pressure to the vehicle range, and c) braking parameters, chassis parameters, and engine parameters that maximize vehicle range based on the load and tire pressure. The system may also include a display configured to display the contribution of the detected load and the detected tire pressure to the vehicle range.

9 Claims, 7 Drawing Sheets

(51) Int. Cl.
*B60W 50/14* (2020.01)
*G07C 5/00* (2006.01)

(52) U.S. Cl.
CPC ............ *B60W 10/18* (2013.01); *B60W 40/13* (2013.01); *B60W 50/14* (2013.01); *G07C 5/004* (2013.01); *B60W 2050/146* (2013.01)

(58) Field of Classification Search
CPC ........ B60W 2510/18; B60W 2510/22; B60W 2530/10; B60W 2530/16; B60W 2530/20; B60W 2050/146; B60W 2300/12; Y02T 10/84; G07C 5/004; G07C 5/0808; G07C 5/0816; G07C 5/0825
See application file for complete search history.

(56) References Cited

U.S. PATENT DOCUMENTS

| | | | |
|---|---|---|---|
| 8,874,367 B2 | 10/2014 | Vicharelli et al. | |
| 9,008,874 B2 | 4/2015 | Wippler | |
| 9,463,818 B2 | 10/2016 | Schoonmaker et al. | |
| 9,604,653 B2 | 3/2017 | Blum | |
| 10,109,218 B2 | 10/2018 | Payne et al. | |
| 2006/0202811 A1* | 9/2006 | Taguchi | B60C 23/04 340/450.2 |
| 2010/0073158 A1* | 3/2010 | Uesaka | B60R 16/0236 340/450.2 |
| 2010/0114437 A1* | 5/2010 | Boss | B60W 10/22 701/48 |
| 2013/0073113 A1* | 3/2013 | Wang | B60W 20/11 701/1 |
| 2013/0124077 A1* | 5/2013 | Kim | B60W 40/13 701/123 |
| 2014/0214267 A1 | 7/2014 | Sellschopp | |
| 2016/0097652 A1* | 4/2016 | Liu | G01C 21/3469 701/423 |
| 2016/0332615 A1* | 11/2016 | Moon | G01G 19/08 |
| 2018/0058868 A1* | 3/2018 | Kang | B60W 20/12 |
| 2019/0049260 A1* | 2/2019 | Gaither | B60K 1/00 |
| 2019/0217866 A1* | 7/2019 | Creguer | B60W 40/12 |
| 2019/0263458 A1* | 8/2019 | Fahland | B62D 35/007 |

\* cited by examiner

VEHICLE RANGE MAXIMIZATION BASED ON EXTERNAL FACTORS

TECHNICAL FIELD

The subject matter described herein relates generally to improving the range of a vehicle and, more particularly, to apparatus, systems, and methods for estimating and maximizing the remaining range of a vehicle based on external factors, such as changes in tire pressure and/or carried mass. This method has particular but not exclusive utility for consumer and commercial cars and trucks with electric or internal combustion propulsion.

BACKGROUND

Vehicle range estimation commonly used in both electric vehicles and internal combustion vehicles, and typically takes place in an electronic control unit (ECU) or vehicle control unit (VCU) within the vehicle. However, when a vehicle is first turned on, range calculations are typically based on expected parameters such as stock mass and stock gas mileage. Once some time has elapsed, range calculations generally transition to an extrapolation of driving history, i.e., actual energy consumption vs. actual distance traveled since the vehicle was turned on. However, such calculations may not take into account sudden changes in tire pressure, or changes in carried mass (i.e., passengers and cargo). For example, if a driver stops the vehicle at a service station and inflates the tires, or picks up passengers and cargo without turning off the engine, or accumulates a mass of rainwater or snow in the bed of a truck, then the driving history will produce inaccurate results.

Many vehicles also have brakes whose performance is controlled in part by parameters such as stiffness, anti-lock thresholds, traction control thresholds, and brake pedal mapping which are controllable through a brake ECU. Similarly, many vehicles have chassis suspension systems whose performance is driven in part by parameters such as ride height, stiffness, pre-load, and damping for each wheel which are controllable by a chassis dynamics ECU or suspension ECU. Additionally, many vehicles have power trains whose performance is controlled in part by parameters such as fuel/air mixture ratios, gear shift mapping, and throttle or accelerator pedal mapping which are controllable by an engine ECU, motor ECU, or drive train ECU. In some cases, these braking, chassis, and drive train parameters are user selectable, e.g., with buttons or menu options such as "Sport Mode", "Economy Mode", or "Traction Mode."

However, these selectable modes also generally do not take into account sudden changes in tire pressure or carried mass, and may thus result in braking, chassis, and engine performance parameters that have a negative impact on vehicle range. In cases where changes have occurred to the vehicle's tire pressure or carried mass, this combination of inappropriate performance parameters and inaccurate range calculations may lead to driver errors such as failing to refuel or recharge at a last available opportunity before actual fuel or energy depletion occurs.

In addition, vehicle operators do not have a way to know the specific impact that tire inflation and carried mass have on the actual range, and are thus unable to make informed decisions regarding these values. For these and other reasons, the costs and difficulties associated with tire inflation and carried mass present numerous unaddressed challenges in the art. Accordingly, long-felt needs exist for range estimation and range maximization apparatus, systems, and methods, that address the forgoing or other concerns.

The information included in this Background section of the specification is included for technical reference purposes only and is not to be regarded as subject matter by which the scope of the disclosure is to be bound.

SUMMARY

Disclosed are apparatus, systems, and methods for estimating and maximizing the range of electric and internal combustion vehicles, henceforth referred to collectively as a "vehicle range maximization system." The vehicle range maximization system tracks external factors, such as tire pressure and/or carried mass, and may report their contributions to total vehicle energy consumption (and thus their negative contributions on vehicle range) to a vehicle operator. The vehicle range maximization system also may control braking, suspension, or engine parameters in real time, to maximize, improve, or otherwise modify vehicle range based on changing values of tire pressure and carried mass.

In some implementations, the present disclosure is directed to a range maximization system for a vehicle accounting for external factors. The system may include a tire pressure sensor disposed about the vehicle configured to detect a tire pressure of the vehicle and a load carry sensor disposed about the vehicle configured to detect information relevant to a load on the vehicle. A vehicle control unit may be configured to receive detected information from the tire pressure and load carry sensor, and configured to determine a) an expected range for the vehicle with the detected information relevant to the load and the detected tire pressure, b) a contribution of the detected information relevant to the load and the detected tire pressure to the vehicle range, and c) braking parameters, chassis parameters, and engine parameters that maximize vehicle range based on the load and tire pressure. The system may also include a display configured to display the contribution of the detected load and the detected tire pressure to the vehicle range.

In some aspects, the system includes a brake electronic control unit configured to control one or more brakes of the vehicle based on the braking parameters; a chassis electronic control unit configured to control one or more chassis elements of the vehicle based on the chassis parameters; and an engine electronic control unit configured to control one or more engine elements of the vehicle based on the engine parameters. In some aspects, the braking parameters comprise at least one of stiffness, anti-lock thresholds, traction control thresholds, and brake pedal mapping. In some aspects, the chassis parameters comprise at least one of ride height, stiffness, pre-load, and damping. In some aspects, the chassis parameters are determined separately for each wheel of the vehicle. In some aspects, the engine parameters comprise at least one of fuel/air mixture ratios, gear shift mapping, and throttle or accelerator pedal mapping.

The present disclosure is also directed to a range maximization system for a vehicle accounting for external factors, including a load carried by the vehicle and a tire pressure management system capable of determining a tire pressure of each tire on the vehicle. The system may also include a mass determination system capable of estimating the load carried by the vehicle and a rolling resistance determination system capable of estimating a rolling resistance of the vehicle. A range estimation system may be capable of determining an expected range for the vehicle with the determined tire pressures and the estimated load. A parsing system (forming a part of or subroutine within the VCU 110) may be capable of estimating contributions of the determined tire pressures and the estimated load to one or more of the rolling resistance and the range. A display configured to show to a vehicle operator the contributions of the determined tire pressures and the estimated load to one or more of the rolling resistance and the range.

In some aspects, the mass determination system is configured to determine a gross weight of the vehicle including the load based on data received from sensors including at least one of a velocity, an acceleration, an accelerator pedal position, a power output, and a G-force. In some aspects, the system includes a vehicle control unit disposed within the vehicle and configured to a) receive the determined tire pressure of each tire b) receive one or more of the estimated load and the estimated contribution of the load to the rolling resistance, and c) compute braking parameters, chassis parameters, and motor parameters that maximize vehicle range based on the estimated load and the determined tire pressure. The system may include a brake electronic control unit configured to control one or more brakes of the vehicle based on the braking parameters; a chassis electronic control unit configured to control a suspension of one or more wheels of the vehicle based on the chassis parameters; and a motor electronic control unit configured to control one or more elements of one or more motors of the vehicle based on the motor parameters. In some aspects, the range estimation system is configured to determine a gross weight of the load by taking into account at least one of: an expected vehicle weight without the load, a sensed weight of the load, a sensed drag or rolling resistance of the load, elevation or grade information along a route, and an inclination of the vehicle. In some aspects, the braking parameters comprise at least one of stiffness, anti-lock thresholds, traction control thresholds, and brake pedal mapping. In some aspects, the chassis parameters comprise at least one of ride height, stiffness, pre-load, and damping. In some aspects, the motor parameters comprise at least one of fuel/air mixture ratios, gear shift mapping, and throttle or accelerator pedal mapping.

In additional aspects, the present disclosure is directed to a method of modifying a driving range for a vehicle accounting for external factors. The method may include gathering information from an energy storage device and sensors of a vehicle; determining a tire pressure of the vehicle and determining a load carried on the vehicle based on the information from at least one of the sensors; determining the driving range of the vehicle with the determined tire pressure and the determined load; determining a contribution of the determined tire pressure and the determined load to the range of the vehicle; and displaying to a vehicle operator the contribution of the determined tire pressure and the determined load to the range of the vehicle, such that the vehicle operator is informed to make changes to the load or the tire pressure in order to modify the range of the vehicle.

In some aspects, the method may also include determining brake parameters to modify the range of the vehicle with the tire pressure and the load; and communicating the brake parameters to a brake ECU capable of controlling one or more brakes of the vehicle. In some aspects, the method may include determining chassis parameters to modify the range of the vehicle with the tire pressure and the load; and communicating the chassis parameters to a chassis ECU capable of controlling one or more chassis elements of the vehicle. In some aspects, the method may include determining drive train parameters to modify the range of the vehicle with the tire pressure and the load; and communicating the drive train parameters to a drive train ECU capable of controlling one or more drive train elements of the vehicle.

In some implementations, the present disclosure is directed to a range maximization system for a vehicle accounting for external factors, that includes a sensor configured to measure a parameter of an external factor impacting a range of the vehicle; a vehicle control unit configured to receive detected information from the sensor, and configured to determine a) an expected range for the vehicle with the detected information, b) a contribution of the detected information to the vehicle range; and a display inside the vehicle configured to display the contribution of the detected information to an operator. In some aspects, the external factor is one of a tire pressure and a load carried by the vehicle and the sensor is configured to measure said one of the tire pressure or the load carried by the vehicle.

The vehicle range maximization system disclosed herein has particular, but not exclusive, utility for consumer and commercial cars and trucks with electric, internal combustion, or hybrid propulsion.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the method, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

Figure 1:
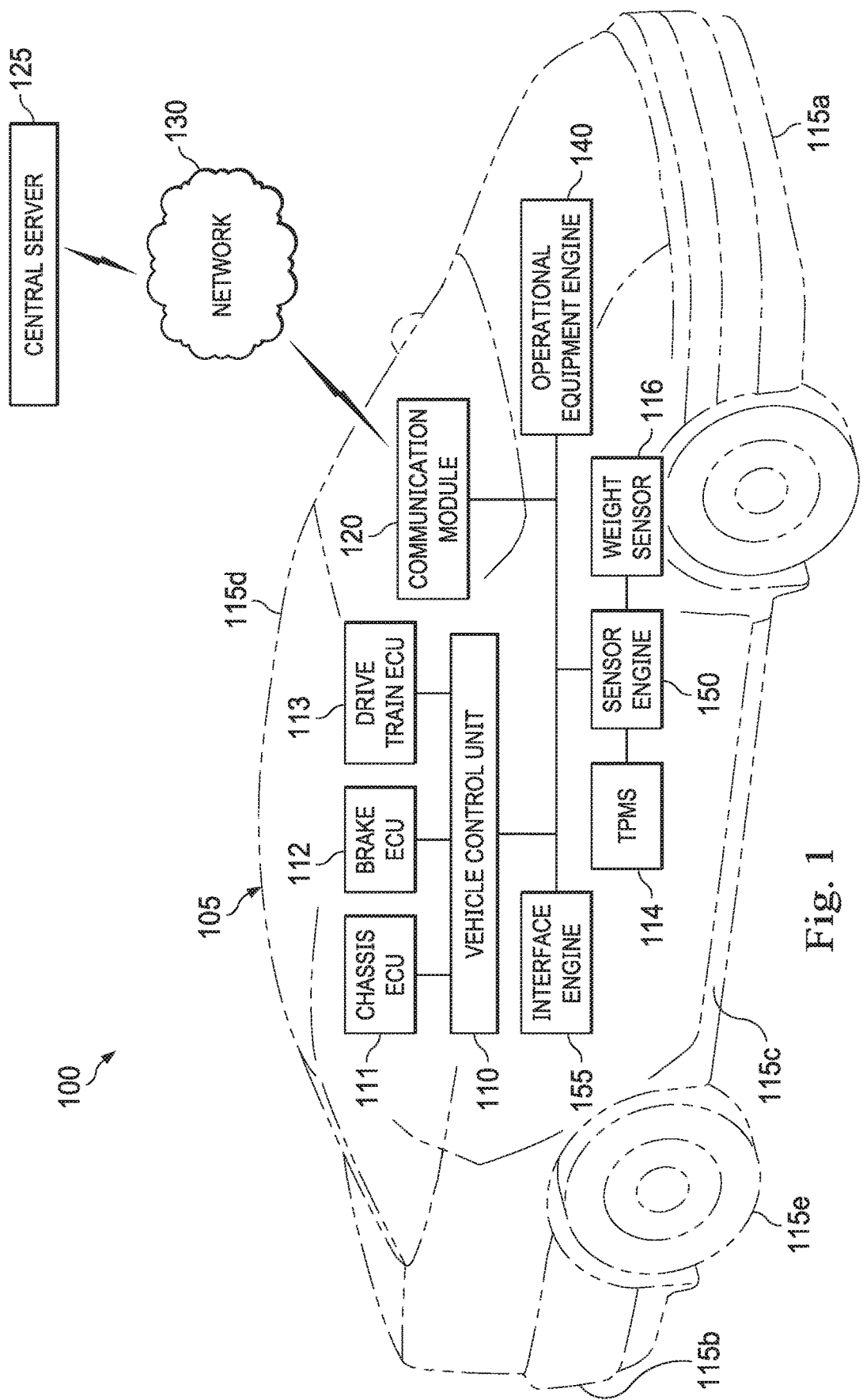
FIG. 1 is a diagrammatic illustration of a vehicle including a vehicle range maximization system, in accordance with at least one embodiment of the present disclosure.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. It is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

Disclosed are apparatus, systems, and methods for estimating, reporting, and improving the range of electric and internal combustion vehicles, henceforth referred to collectively as a "vehicle range maximization system." The vehicle range maximization system tracks factors external to the vehicle that impact vehicle range, such as tire pressure through a tire pressure monitoring system (TPMS), and incorporates tire pressure sensors that communicate with a vehicle control unit. Typically, this system is only used to alert a vehicle operator to a low-tire-pressure condition when one or more tires drop below a factory-determined pressure threshold. However, the TPMS described herein may be used by the presently disclosed vehicle range maximization system to determine whether the pressure of each tire is at or below the factory recommended level by any amount, regardless of the TPMS alert threshold. Low tire pressures cause an increase in the rolling resistance of the vehicle and a decrease in gas mileage or energy efficiency, and thus a decrease in range by a predictable amount. The vehicle range maximization system also may track the vehicle's carried load through any of a variety of methods described below. Carried loads may include the driver, passengers, cargo, and the weight of dirt, mud, water or snow deposited onto or into the vehicle (e.g., in a truck bed). Carried loads increase the mass of the vehicle, and therefore also increase the energy required to accelerate it to a given speed or to elevate it along an upward-sloping road. Carried loads also affect handling, friction, tire compression, ride height, and other parameters capable of affecting vehicle range.

In some implementations, the vehicle range maximization system maximizes, optimizes, improves, or otherwise modifies a vehicle's range in two complementary ways: first, it determines the contributions of external factors such as tire pressure and carried load to the vehicle's total energy consumption (and thus their negative contributions to vehicle range) and communicates those to a vehicle operator (e.g., through an in-dash display, combimeter, audio TFT display, or through other means). This enables the operator to make real-time decisions (e.g., pulling off the road to reduce the load or to inflate the tires) that will improve vehicle range. Second, the vehicle range maximization system also recalculates and updates control parameters such as braking, suspension, or engine control (drive train control) parameters in real time, to maximize vehicle range based on changing values of tire pressure and carried mass as described below.

In particular, in accordance with at least one embodiment of the present disclosure, the vehicle range maximization system may accept information from a variety of different weight sensors, drag sensors, speed sensors, and rolling resistance sensors, in order to calculate vehicle mass. Additionally, in accordance with at least one embodiment of the present disclosure, the vehicle range maximization system may accept information from a mapping service, geographic information system (GIS) service, or other service about the elevation, road grades, and topography along the present route in order to calculate vehicle mass.

These descriptions are provided for exemplary purposes, and should not be considered to limit the scope of the vehicle range maximization system. Certain features may be added, removed, or modified without departing from the spirit of the claimed subject matter.

FIG. 1 is a diagrammatic illustration of a vehicle range maximization system in accordance with at least one embodiment of the present disclosure. In an example, a vehicle range maximization system is referred to by the reference numeral 100 and includes a vehicle 105, such as an automobile, and a vehicle control unit 110 located on the vehicle 105. The vehicle 105 may include a front portion 115a (including a front bumper), a rear portion 115b (including a rear bumper), a right side portion 115c (including a right front quarter panel, a right front door, a right rear door, and a right rear quarter panel), a left side portion 115d (including a left front quarter panel, a left front door, a left rear door, and a left rear quarter panel), and wheels 115e. A communication module 120 is operably coupled to, and adapted to be in communication with, the vehicle control unit 110. The communication module 120 is adapted to communicate wirelessly with a central server 125 via a network 130 (e.g., a 3G network, a 4G network, a 5G network, a Wi-Fi network, or the like). The central server 125 may provide information and services including but not limited to include location, mapping, route or path, and topography information.

An operational equipment engine 140 is operably coupled to, and adapted to be in communication with, the vehicle control unit 110. A sensor engine 150 is operably coupled to, and adapted to be in communication with, the vehicle control unit 110. The sensor engine 150 is adapted to monitor various components of, for example, the operational equipment engine 140, as will be described in further detail below. An interface engine 155 is operably coupled to, and adapted to be in communication with, the vehicle control unit 110. In addition to, or instead of, being operably coupled to, and adapted to be in communication with, the vehicle control unit 110, the communication module 120, the operational equipment engine 140, the sensor engine 150, and/or the interface engine 155 may be operably coupled to, and adapted to be in communication with, another of the components via wired or wireless communication (e.g., via an in-vehicle network). In some examples, the vehicle control unit 110 is adapted to communicate with the communication module 120, the operational equipment engine 140, the sensor engine 150, and the interface engine 155 to at least partially control the interaction of data with and between the various components of the vehicle range maximization system 100.

The term "engine" is meant herein to refer to an agent, instrument, or combination of either, or both, agents and instruments that may be associated to serve a purpose or accomplish a task—agents and instruments may include sensors, actuators, switches, relays, power plants, system wiring, computers, components of computers, programmable logic devices, microprocessors, software, software routines, software modules, communication equipment, networks, network services, and/or other elements and their equivalents that contribute to the purpose or task to be accomplished by the engine. Accordingly, some of the engines may be software modules or routines, while others of the engines may be hardware and/or equipment elements in communication with any or all of the vehicle control unit 110, the communication module 120, the network 130, or a central server 125.

In this example, the vehicle 105 also includes a chassis electronic control unit (ECU) 111 which controls elements of the vehicle's suspension system, a brake ECU 112 which controls the braking system or elements thereof, a drive train ECU 113 (variously known as an engine ECU, power plant ECU, or motor ECU) that controls elements of the motor and drivetrain, a tire pressure monitoring system (TPMS) 114 that monitors tire pressures and reports them to the VCU 110, and one or more weight sensors 116.

A reader of ordinary skill in the art will understand that other components or arrangements of components may be found in a vehicle 105, and that the same general principles apply to electric vehicles, internal combustion vehicles, and hybrid vehicles.

Figure 2:
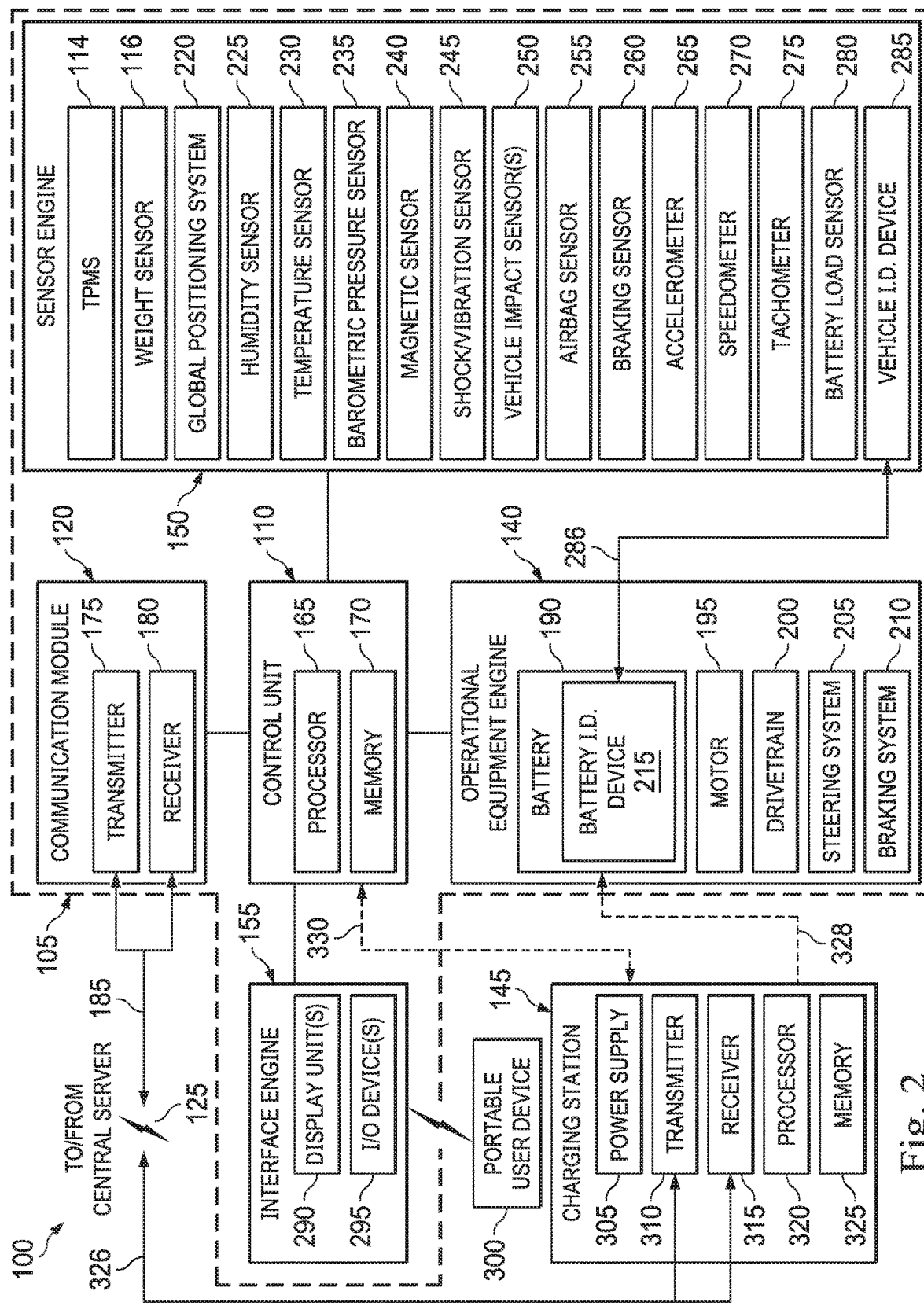
FIG. 2 is a block diagram including several components of the vehicle range maximization system of FIG. 1, in accordance with at least one embodiment of the present disclosure.

FIG. 2 is a diagrammatic illustration in a block-diagram form of at least a portion of the vehicle range maximization system 100 of FIG. 1, in accordance with at least one embodiment of the present disclosure. It is worth noting that the components of the vehicle 105 may be located either permanently or temporarily as a part of the vehicle 105. The vehicle control unit (VCU) 110 includes a processor 165 and a memory 170. In some examples, the communication module 120, which is operably coupled to, and adapted to be in communication with, the vehicle control unit 110, includes a transmitter 175 and a receiver 180. In some examples, one or the other of the transmitter 175 and the receiver 180 may be omitted according to the particular application for which the communication module 120 is to be used. In other examples, the transmitter 175 and receiver 180 are combined into a single transceiver that performs both transmitting and receiving functions.

In some examples, the operational equipment engine 140, which is operably coupled to, and adapted to be in communication with, the vehicle control unit 110, includes a plurality of devices configured to facilitate driving of the vehicle 105. In this regard, the operational equipment engine 140 may be designed to exchange communication with the vehicle control unit 110, so as to not only receive instructions, but to provide information on the operation of the operational equipment engine 140. For example, the operational equipment engine 140 may include a vehicle battery 190, a motor 195, a drivetrain 200, a steering system 205, and a braking system 210. The vehicle battery 190 provides electrical power to the motor 195 to drive the wheels 115e of the vehicle 105 via the drivetrain 200. In some examples, in addition to providing power to the motor 195 to drive the wheels 115e of the vehicle 105 via the drivetrain 200, the vehicle battery 190 provides electrical power to another component of the operational equipment engine 140, the vehicle control unit 110, the communication module 120, the sensor engine 150, the interface engine 155, or any combination thereof. In some examples, the vehicle battery 190 includes a battery identification device 215. The battery identification device 215 is adapted to communicate with one or more components of the sensor engine 150, and stores data identifying the vehicle battery 190 such as, for example, manufacturing information (e.g., production date, production facility, etc.), battery characteristic(s) information, battery identification number information, electric vehicle compatibility information, or the like.

In some examples, the sensor engine 150, which is operably coupled to, and adapted to be in communication with, the vehicle control unit 110, includes devices such as sensors, meters, detectors, or other devices configured to measure or sense a parameter related to a driving operation of the vehicle 105. For example, the sensor engine 150 may include a global positioning system 220, a humidity sensor 225, a temperature sensor 230, a barometric pressure sensor 235, a magnetic sensor 240, a shock/vibration sensor 245, a vehicle impact sensor 250, an airbag sensor 255, a braking sensor 260, an accelerometer 265, a speedometer 270, a tachometer 275, a battery load sensor 280, a vehicle identification device 285, a TPMS 114, a weight sensor 116, or any combination thereof. The sensors or other detection devices may be configured to sense or detect activity, conditions, and circumstances in an area to which the device has access, e.g., ambient conditions or conditions within a battery compartment. Sub-components of the sensor engine 150 may be deployed at any operational area where information on the driving of the vehicle 105 may occur. Readings from the sensor engine 150 are fed back to the vehicle control unit 110. Stored and reported performance data may include the sensed data, or may be derived, calculated, or inferred from sensed data. The vehicle control unit 110 may send signals to the sensor engine 150 to adjust the calibration or operating parameters of the sensor engine 150 in accordance with a control program in the vehicle control unit 110. The vehicle control unit 110 is adapted to receive and process performance data from the sensor engine 150 or from other suitable source(s), and to monitor, store (e.g., in the memory 170), and/or otherwise process (e.g., using the processor 165) the received performance data.

The braking sensor 260 is adapted to monitor usage of the vehicle 105's braking system 210 (e.g., an antilock braking system 210) and to communicate the braking information to the vehicle control unit 110. The accelerometer 265 is adapted to monitor acceleration of the vehicle 105 and to communicate the acceleration information to the vehicle control unit 110. The accelerometer 265 may be, for example, a two-axis accelerometer 265 or a three-axis accelerometer 265. In some examples, the accelerometer 265 is associated with an airbag of the vehicle 105 to trigger deployment of the airbag. The speedometer 270 is adapted to monitor speed of the vehicle 105 and to communicate the speed information to the vehicle control unit 110. In some examples, the speedometer 270 is associated with a display unit of the vehicle 105 such as, for example, a display unit of the interface engine 155, to provide a visual indication of vehicle speed to a driver of the vehicle 105. The tachometer 275 is adapted to monitor the working speed (e.g., in revolutions-per-minute) of the vehicle 105's motor 195 and to communicate the angular velocity information to the vehicle control unit 110. In some examples, the tachometer 275 is associated with a display unit of the vehicle 105 such as, for example, a display unit of the interface engine 155, to provide a visual indication of the motor 195's working speed to the driver of the vehicle 105. The battery load sensor 280 is adapted to monitor charging, discharging, and/or overcharging of the vehicle battery 190 and to communicate the charging, discharging, and/or overcharging information to the vehicle control unit 110.

In some examples, the vehicle identification device 285 stores data identifying the vehicle 105 such as, for example, manufacturing information (e.g., make, model, production date, production facility, etc.), vehicle characteristic(s) information, vehicle identification number ("VIN") information, battery compatibility information, or the like. The vehicle identification device 285 is adapted to communicate with the battery identification device 215 (or vice versa), as indicated by arrow 286. In some examples, the vehicle identification device 285 and the battery identification device 215 may each communicate with the vehicle control unit 110.

In some examples, the interface engine 155, which is operably coupled to, and adapted to be in communication with, the vehicle control unit 110, includes at least one input and output device or system that enables a user to interact with the vehicle control unit 110 and the functions that the vehicle control unit 110 provides. For example, the interface engine 155 may include a display unit 290 and an input/output ("I/O") device 295. The display unit 290 may be, include, or be part of multiple display units. In some examples, the display unit 290 may include one, or any combination, of a central display unit associated with a dash of the vehicle 105, an instrument cluster display unit associated with an instrument cluster of the vehicle 105, and/or a heads-up display unit associated with the dash and a windshield of the vehicle 105; accordingly, as used herein the reference numeral 290 may refer to one, or any combination, of the display units. The I/O device 295 may be, include, or be part of a communication port (e.g., a USB port), a Bluetooth communication interface, a tough-screen display unit, soft keys associated with a dash, a steering wheel, or another component of the vehicle 105, and/or similar components. Other examples of sub-components that may be part of the interface engine 155 include, but are not limited to, audible alarms, visual alerts, telecommunications equipment, and computer-related components, peripherals, and systems.

In some examples, a portable user device 300 belonging to an occupant of the vehicle 105 may be coupled to, and adapted to be in communication with, the interface engine 155. For example, the portable user device 300 may be coupled to, and adapted to be in communication with, the interface engine 155 via the I/O device 295 (e.g., the USB port and/or the Bluetooth communication interface). In an example, the portable user device 300 is a handheld or otherwise portable device which is carried onto the vehicle 105 by a user who is a driver or a passenger on the vehicle 105. In addition, or instead, the portable user device 300 may be removably connectable to the vehicle 105, such as by temporarily attaching the portable user device 300 to the dash, a center console, a seatback, or another surface in the vehicle 105. In another example, the portable user device 300 may be permanently installed in the vehicle 105. In some examples, the portable user device 300 is, includes, or is part of one or more computing devices such as personal computers, personal digital assistants, cellular devices, mobile telephones, wireless devices, handheld devices, laptops, audio devices, tablet computers, game consoles, cameras, and/or any other suitable devices. In several examples, the portable user device 300 is a smartphone such as, for example, an iPhone® by Apple Incorporated.

A reader of ordinary skill in the art will understand that other components or arrangements of components may be found in a vehicle 105, and that the same general principles apply to electric vehicles, internal combustion vehicles, and hybrid vehicles.

Figure 3:
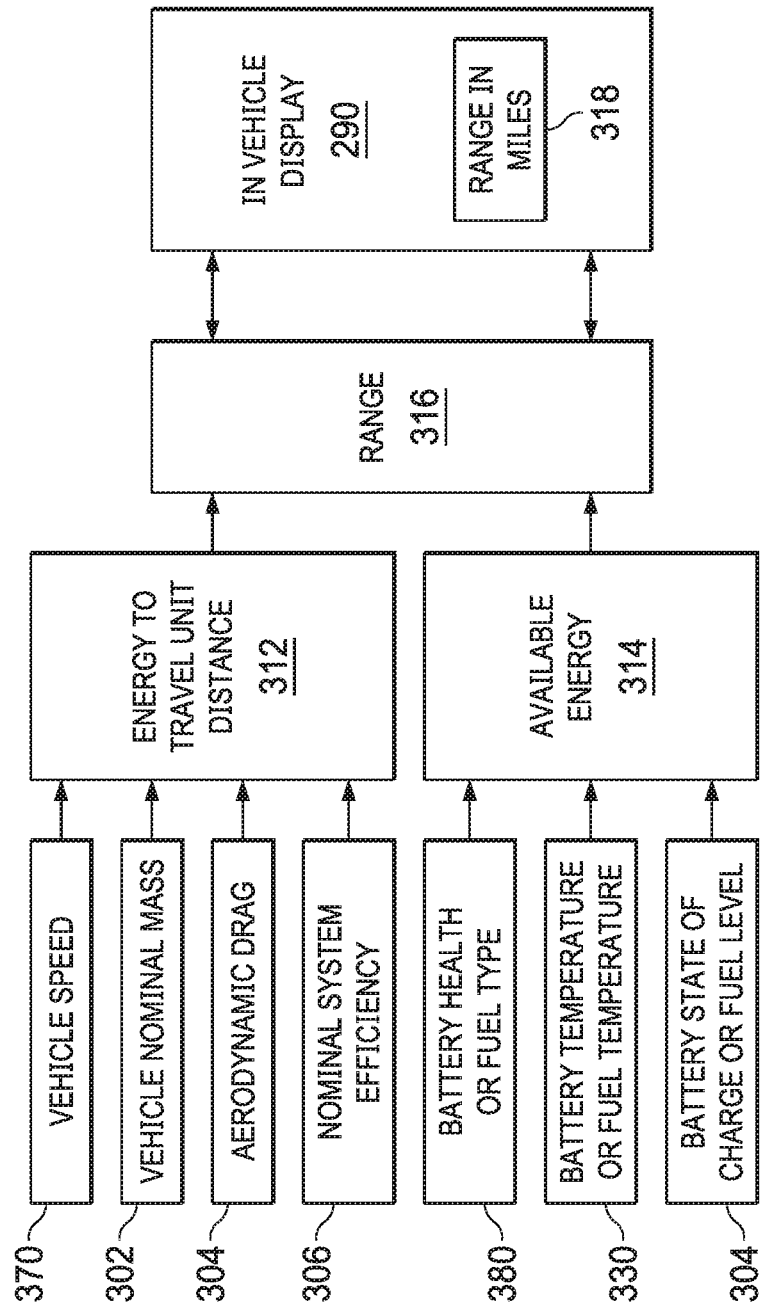
FIG. 3 is a block diagram indicating some basic elements involved in displaying a calculated vehicle range in a vehicle.

FIG. 3 is a diagrammatic illustration indicating the basic elements involved in calculating and displaying a range for a vehicle 105 (e.g., an electric vehicle) using physics calculations. In an example, the procedure begins with the acquisition of variables including but not limited to a vehicle speed 370, vehicle nominal mass 302, vehicle aerodynamic drag 304, nominal system efficiency 306, battery health 380, battery temperature 330, and battery state of charge 382. In an example, the vehicle speed 370 is acquired from the speedometer 270. In an example, the vehicle nominal mass 302 (e.g., a stock or expected mass or weight) and nominal system efficiency 306 are acquired from read-only memory locations within the memory 170 of the Vehicle Control Unit (VCU) 110. In an example, the aerodynamic drag 304 and battery health 380 are acquired from computations performed by the VCU 110 based on detected information such as variables, or constants. In an example, the battery temperature 330 is acquired from the temperature sensor 230, and the battery state of charge is acquired from the battery sensor 280. In an example, for an internal combustion vehicle, fuel tank temperature and fill level may be used in place of battery temperature and battery state of charge.

In an example, an Energy to Travel Unit Distance 312 and Available Energy 314 are then computed, and a Range 316 (i.e., the estimated range the vehicle is expected to be able to travel, using the remaining stored energy) is computed based on these two values. In an example, these computations occur within the VCU 110, although other components may be used. Next, a display 290 shows a range display 318, which conveys the range 316 to an interested party, such as a vehicle operator. The range display 318 may be positioned for viewing by the vehicle operator. The range display 318 may express the remaining range, such as a real-time estimation of the remaining range, in miles, kilometers, or any other unit as either a design choice or an operator selection. In an example, the display 290 may be a single in-vehicle display (e.g., an LED or LCD screen). In other examples it may be several components of a dashboard or instrument panel.

A reader of ordinary skill in the art will understand that other variables or calculations may be included than those recited here, and that variables may be acquired from different or multiple sources, in order to produce and report an accurate and timely estimate of the expected range of a vehicle while the vehicle is in operation. In some cases, the accuracy of an estimate may be affected by the number and quality of variables that are used to calculate it, such that less accurate estimates may readily be obtained using a small number of variables, whereas highly refined estimates may require data from a larger number of sensors and/or the calculation of one or more additional variables from the available data. The diagram of FIG. 3 is shown for exemplary purposes, and does not limit the matter claimed by the present disclosure.

Figure 4:
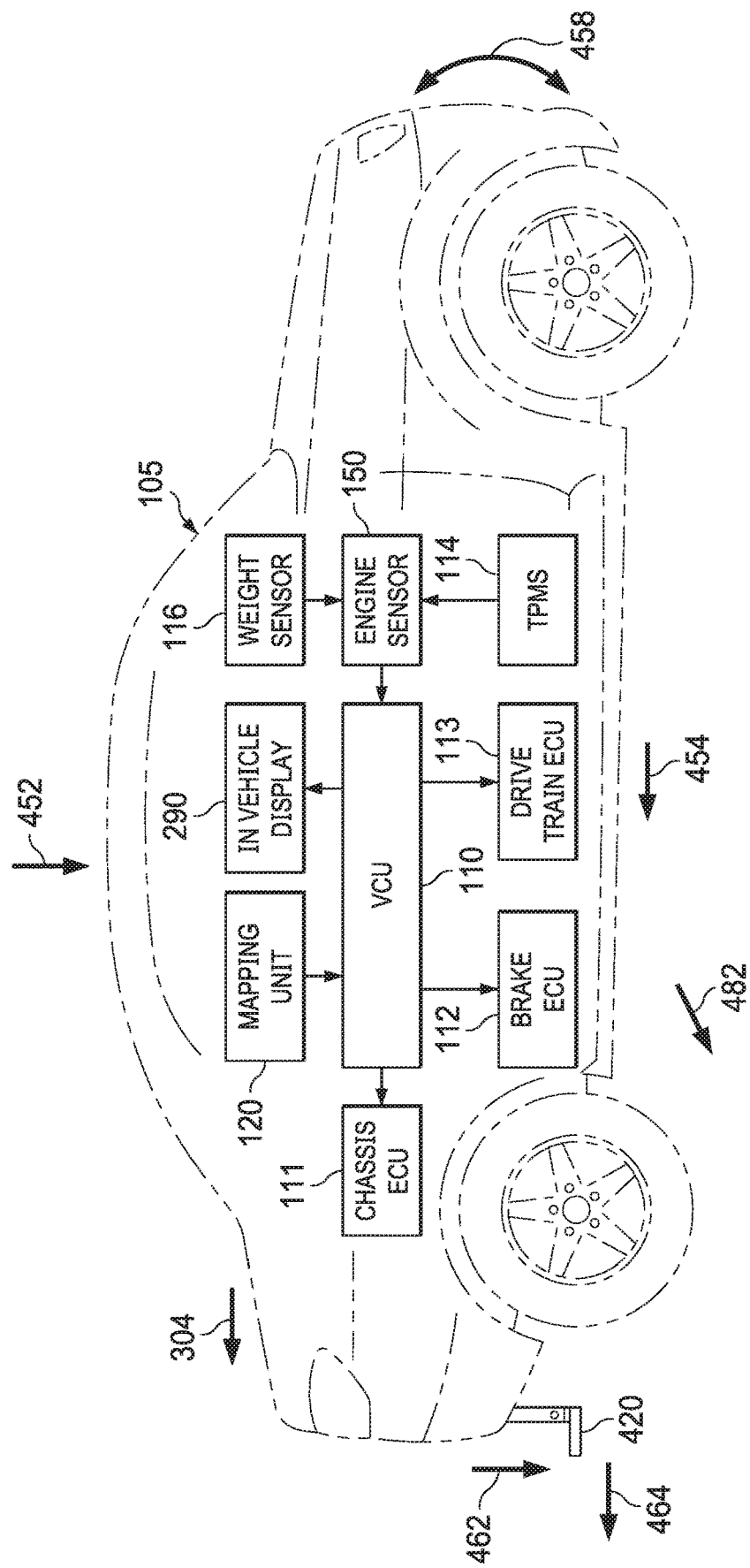
FIG. 4 is an exemplary diagrammatic illustration of the forces operating on a vehicle including the vehicle range maximization system in accordance with at least one embodiment of the present disclosure.

FIG. 4 is an exemplary diagrammatic illustration of the vehicle range maximization system 100 as a vehicle 105 in accordance with at least one embodiment of the present disclosure. In this implementation, for clarity, only certain engines, systems, and components are shown. However, other engines, systems, and components, including those describe herein, are also contemplated as being a part of the vehicle range maximization system 100 shown in FIG. 4. In the example shown, the vehicle 105 includes a trailer hitch 420. In this example, within the vehicle 105 the VCU 110 receives information from a sensor engine 150, which receives information from a TPMS 114, as well as one or more weight sensors 116. The VCU 110 may also receive information from a mapping unit 120, either or both of which may be used to determine vehicle mass as discussed below. In addition, the VCU 110 sends information to the chassis ECU 111, brake ECU 112, drive train ECU 113, and in-vehicle display 290.

Force variables that may be incorporated into physics calculations within the VCU 110 include but are not limited to the vehicle absolute weight 452, vehicle rolling friction 454, vehicle aerodynamic drag 304, vehicle pitch 458, and in some cases trailer hitch tongue weight 462 and trailer hitch tongue drag 464. In some examples, each of these variables is a force that may be expressed in lbf, Newtons, or any other unit of force as desired. In an example, the vehicle pitch 458 is stored within the memory 170 of the Vehicle Control Unit 110, and is calculated based on data from the accelerometer 265 to provide a sensed acceleration, and the first derivative of the vehicle speed 270 from the speedometer 270 to provide an acceleration value tangent to the road surface. The difference between these two acceleration vectors indicates vehicle pitch 458. If force sensors exist in the trailer hitch 420, it may be possible to obtain a direct measurement of the tongue weight 462 and tongue drag 464, where appropriate (e.g., if a trailer is attached). Vehicle pitch may also be measured with an inclinometer.

Others of the force variables may not be directly known, but may be estimated from graphs, curves, or lookup tables for a nominal vehicle (e.g., vehicle weight 452, vehicle rolling friction 454, and vehicle aerodynamic drag 304). Other variables may be calculated or estimated from performance variables that normally exist within the VCU 110. For example, the combined mass, gross weight, or inertia of the vehicle 105 and trailer 450 may be determined from the acceleration profile of the vehicle given a known force imparted by the motor 195 and drivetrain 200, and the Newtonian relationship F=ma. The mass of the carried load may then be estimated by subtracting a nominal or expected vehicle mass (e.g., stock weight or stock mass. Alternatively, if the road grade is known (e.g., from GPS data), the combined vehicle and carried load mass may be estimated based on the work or energy required for the operational equipment engine to push the vehicle uphill, or the force required hold it from rolling backward. In an example, these and related methods are used to determine whether a substantial carried load is present, and if so, to activate other features of the present disclosure as described below.

In other cases, the carries load may be measured by means of weight sensors (e.g., load cells). For example, the vehicle might provide one or more load cells located in its seats, one or more load cells located in its cargo areas, and one or more load cells located in roof racks and/or truck beds of the vehicle. Alternatively, the vehicle might provide one or more weight sensors disposed about the chassis of the vehicle that are capable of measuring the sprung weight of the vehicle, or weight sensors built into the tires that are capable of measuring the sum of sprung and unsprung weights of the vehicle. In another example, the vehicle might provide one or more sensors disposed about the chassis of the vehicle, whereby changes in the suspension geometry may be used to deduce changes in the carried mass of the vehicle. These could include load cells in each damper/strut, ride height sensor measuring spring compression(s) or a laser measuring vehicle ride height. The detected load or carried load of the vehicle is simply the actual mass of the vehicle minus the stock or expected mass of the vehicle.

The total drag on the vehicle can be calculated based on the power output required to maintain a particular vehicle speed 370, and the sum of trailer aerodynamic drag 476 and rolling friction 474 may be computed based by subtracting nominal or estimated values of the vehicle rolling friction 454 and aerodynamic drag 304. The ratio of aerodynamic drag to rolling friction can be estimated from known relationships for typical vehicles, or by other methods. The grade of the road or ground surface under the vehicle may be calculated from accelerometers. Vehicle pitch 458 and vehicle weight 452 can be used to calculate the tongue weight 462 of a trailer hitch 420 by treating the vehicle 105 as a lever.

If the road grade is known, which may be calculated or taken directly from stored maps, GPS data or other indicators, the combination of vehicle weight 452, vehicle aerodynamic drag 304, and vehicle rolling friction 454 can be used to compute a vehicle rolling resistance vector 482 (e.g., as a vector sum of the force vectors). Alternatively, if the vehicle rolling resistance 482 can be computed based on performance data stored within the VCU 110, the forces that contribute to the rolling resistance 482 may be computed or estimated. Accelerator pedal position may also be incorporated as being proportional to an expected power output for the motor 195. The contribution of tire inflation to rolling resistance 482 may be the remainder when all known weight and drag force vectors are subtracted from the rolling resistance 482. Alternatively, the contribution of tire inflation to rolling resistance may be computed based on equations or lookup tables based on the nominal or expected performance of the vehicle with such tire pressures.

Expected range 316 for a vehicle 105 is proportional to the rolling resistance the vehicle 105 experiences while in motion, so a range estimate 316 computed from the total rolling resistance 482 (or from the separate variables that contribute thereto) will indicate the range of the vehicle 105 with the carried load and tire inflation, whereas a range estimate 316 computed from the nominal vehicle mass and nominal tire inflation will indicate the range of the vehicle without these factors. Similarly, an expected range may be calculated for the vehicle with the carried mass but nominal tire inflation, and for the vehicle with the nominal mass but actual tire inflation. From these values, the percent contribution of carried mass and tire inflation may be computed for both the rolling resistance and the range of the vehicle.

Histories, time averages, first derivatives, integrals, or filters of any of the aforementioned variables, along with known, anticipated, or estimated future values for some or all of the variables may also be incorporated into the physics calculations to improve or refine the results of the calculations.

For convenience, the foregoing methods and procedures may be optionally summarized as a tire pressure monitoring system (TPMS), a mass determination system, a rolling resistance determination system, a range estimation system, and a parsing system.

Figure 5:
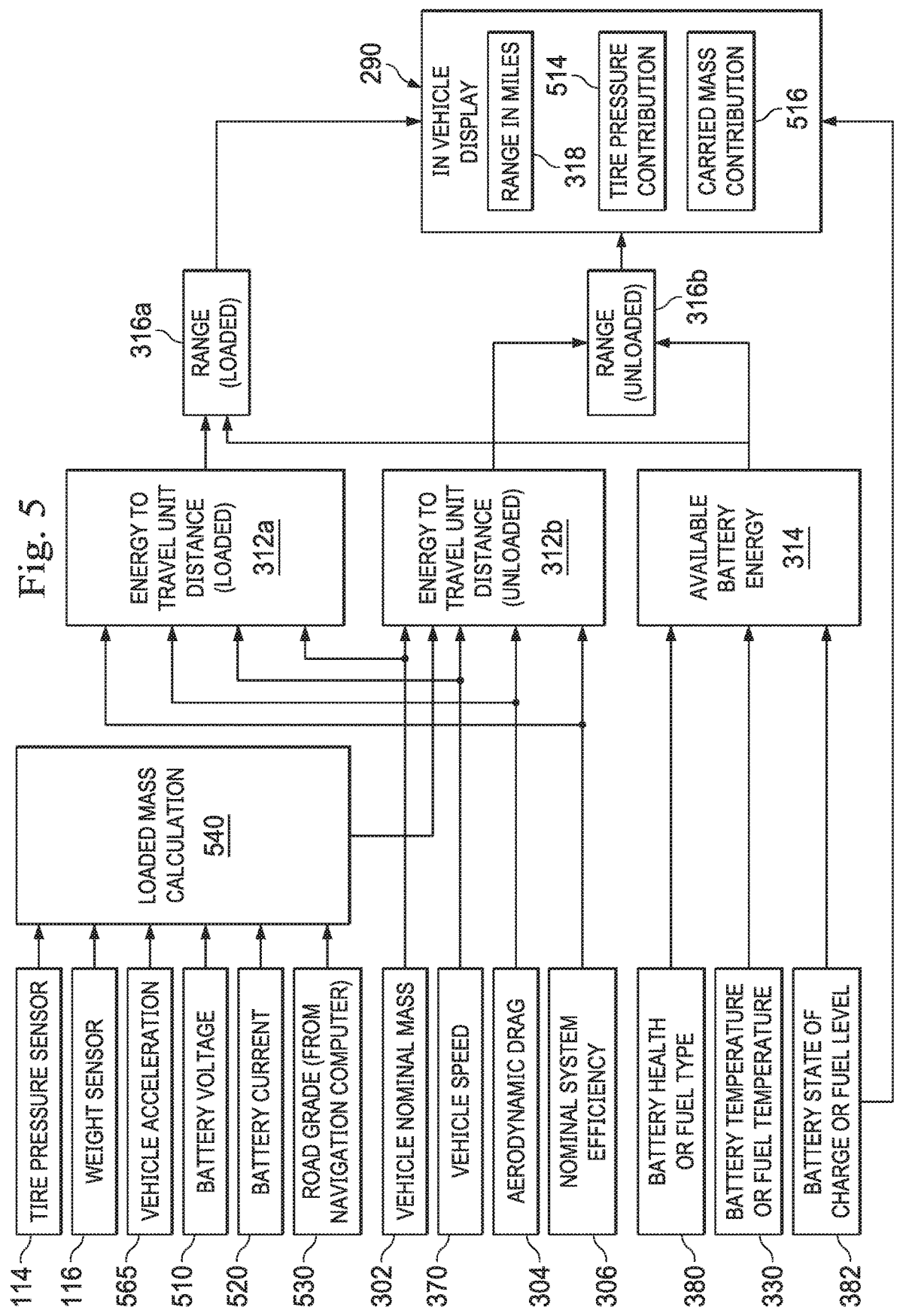
FIG. 5 is a block diagram of a portion of the vehicle range maximization system involved in displaying a calculated vehicle range in accordance with at least one embodiment of the present disclosure.

FIG. 5 is a block diagram of a portion of the vehicle range maximization system 100 including portions of the VCU 110, the sensor engine 150, and the interface engine 155 of FIG. 1. FIG. 5 identifies some basic elements involved in displaying a calculated vehicle range taking into account carried mass, tire pressure, and variables such as those discussed herein in accordance with at least one embodiment of the present disclosure. In an example, as with FIG. 3, the procedure begins with the acquisition of variables including but not limited to a vehicle speed 370, vehicle nominal mass 302, tire pressure 114, vehicle actual mass 116, vehicle aerodynamic drag 304, nominal system efficiency 306, battery health 380, battery temperature 330, and battery state of charge 382. In an example, the vehicle speed 370 is acquired from the speedometer 270. In an example, the vehicle nominal mass 302 and nominal system efficiency are acquired from read-only memory locations within the memory 170 of the Vehicle Control Unit (VCU) 110. In an example, the aerodynamic drag 304 and battery health 380 are acquired from computations performed by the VCU 110. In an example, the battery temperature 330 is acquired from the temperature sensor 230, and the battery state of charge is acquired from the battery sensor 280.

In other embodiments (e.g., for internal combustion vehicles), the battery state of charge 382, battery temperature 330, and battery health 380 may be replaced for example with a fuel gauge reading, fuel temperature reading, and fuel energy content estimate (e.g., based on fuel type), while adhering to the spirit and principles of the present disclosure, which applies equally to electric vehicles, internal combustion vehicles, and hybrid vehicles.

According to at least one embodiment of the present disclosure, a number of additional variables are acquired beyond those seen in FIG. 3. These include but are not limited to vehicle acceleration 565, battery voltage 510, battery current 520, and road grade 530. In an example, the vehicle acceleration 565 is acquired from either or both of the speedometer 270 and the accelerometer 265, the battery voltage 510 and battery current 520 are acquired from the battery sensor 280, and the road grade 530 is acquired from any or all of the global positioning system (GPS) 220, the communication module 120, or the VCU 110. Either or both of the GPS 220 and communication module 120 may receive road grade information from mapping or GIS services on a remote server 125, such information including but not limited to Google Maps, Google Earth, MapQuest, HERE, Bing Maps, OpenStreetMap, and Apple Maps, or their equivalents. The VCU 110 may alternatively estimate the road grade 530 based on data from the accelerometer 265 and speedometer 270. Alternatively, either or both of the GPS 220 and VCU 110 may incorporate stored road grade and elevation data. In this context, singly or collectively, the GPS 220, VCU 110, and remote server 125 may be referred to as a mapping unit (MU).

According to at least one embodiment of the present disclosure, the vehicle acceleration 565, battery voltage 510, battery current 520, and road grade information 530 are used to perform a loaded mass calculation 540. In an example, the loaded mass calculation 540 is a physics calculation that occurs within the vehicle control unit (VCU) 110, and proceeds according to known principles as described hereinabove. The loaded mass calculation 540 may compute any combination of the vehicle rolling resistance 482, vehicle weight 452, vehicle aerodynamic drag 304, and vehicle rolling friction 454 such that the VCU 110 may then, according to known principles, compute the energy 312 required to travel a unit distance in both the loaded state (312a—the energy required with the carried load and/or off-nominal tire inflation) and the unloaded state (312b—the energy required without the carried load and/or off-nominal tire inflation).

In an example, the available energy 314 is then computed, and used along with the energy per unit distance 312a and 312b to compute the Range (loaded) 316a and the Range (unloaded) 316b. In an example, these computations occur within the VCU 110, although other components may be used. Next, in an example, a display 290 shows the range display 318, along with the negative contribution from tire pressure 514 and the negative contribution from carried mass 516. In some implementations, the range display may be expressed in miles, kilometers, or any other unit based on an operator selection. In accordance with at least one embodiment of the present disclosure, the display 290 may be a single in-vehicle display (e.g., an LED or LCD screen), or may be several components of a dashboard or instrument panel.

In some implementations, other variables or calculations may be included in place of or in addition to those recited here, and that those other variables may be acquired from different or multiple sources, in order to produce and report a relatively accurate and timely estimate (including in real-time) of the expected range of a vehicle—along with the negative contributions of tire pressure and carried load—while the vehicle is in operation. In some cases, the accuracy of an estimate may be affected by the number and quality of variables that are used to calculate it, such that less accurate estimates may readily be obtained using a small number of variables, whereas highly refined estimates may require data from a larger number of sensors and/or the calculation of one or more additional or intermediate variables from the available data. Such variations do not depart from the spirit of the present disclosure and fall within the scope of the claimed matter.

Figure 6:
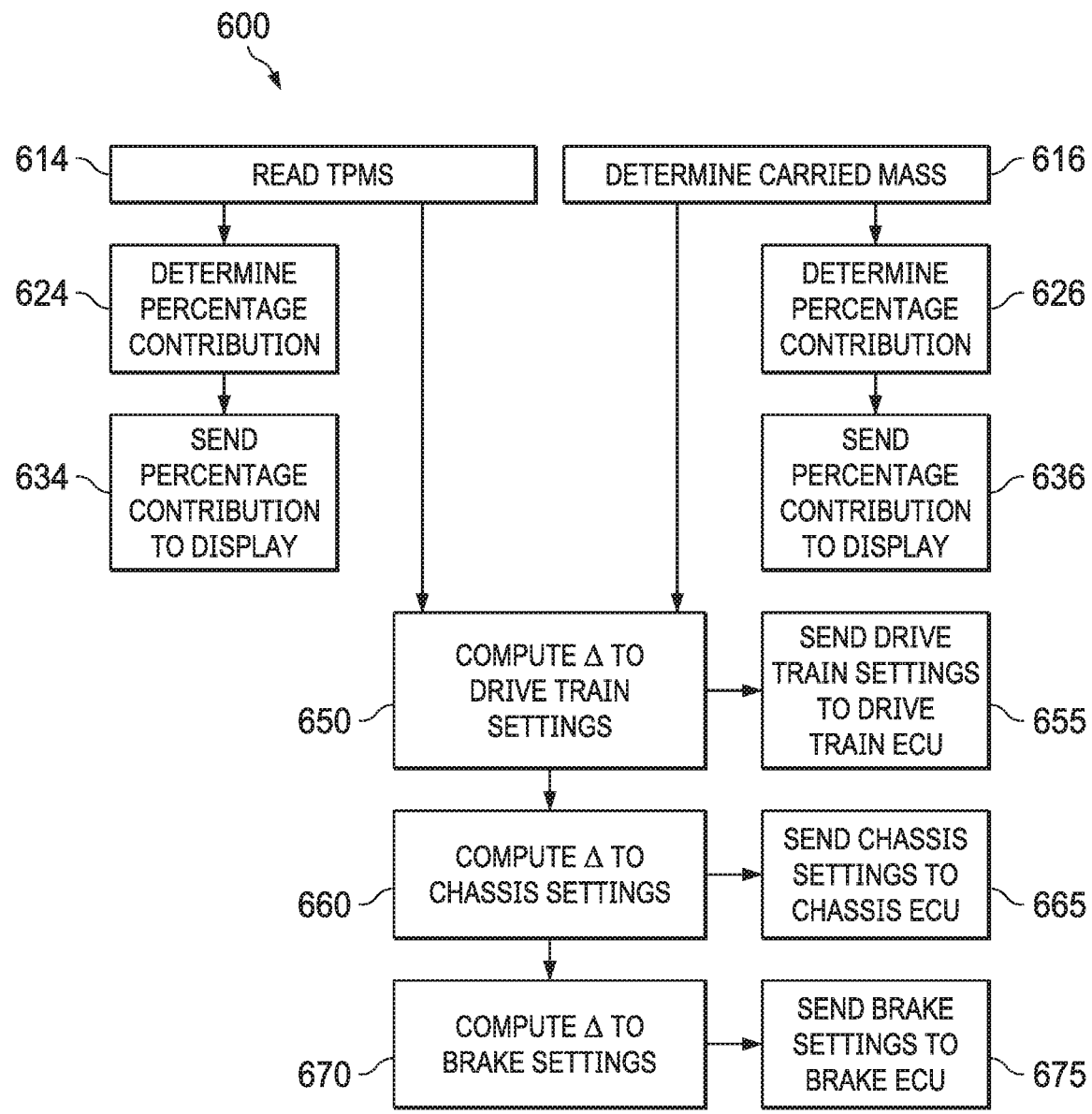
FIG. 6 is a flow diagram of a method of using an example vehicle range maximization system in accordance with at least one embodiment of the present disclosure.

FIG. 6 is a flow diagram 600 of an example method performed by the vehicle range maximization system 100 in accordance with at least one embodiment of the present disclosure. In an example, the steps herein are performed by a vehicle control unit 110, although they could be performed at other locations within the vehicle or by other equipment within the vehicle while producing the described result.

In step 614, the vehicle range maximization system 100 reads tire pressures from the tire pressure monitoring system (TPMS) 114. This reading will be in the native format expressed by the TPMS, but may be translated into any units and any format that are convenient for the vehicle range maximization system 100.

In step 624, the vehicle range maximization system 100 determines the estimated contribution of the tire pressures to the vehicle's range 316a using the principles, procedures, and methods outlined hereinabove, or other related principles, procedures, and methods that produce the described result. The contribution of the tire pressures may take the form of a percent of total energy consumption or fraction of total energy consumption attributable to off-nominal tire pressure, or may be expressed in terms of the actual energy or power requirement associated with the off-nominal tire inflation, alongside total energy consumption of the vehicle. Other ways of expressing the contribution are also contemplated.

In step 634, the range contribution of the tire pressures is sent to the in-vehicle display 290, where it is visible to the vehicle operator and any interested passengers. The contribution of the tire pressures to vehicle range will indicate both the severity of the problem and the potential value in correcting it. In an example, if the contribution of low tire pressure to overall energy consumption is 6.2%, then that might indicate a rather severe energy drain, and a large potential savings (i.e., large range increase) if the tires are inflated to a factory recommended pressure.

In step 616, the vehicle range maximization system 100 determines the carried mass, using the sensors, principles, procedures, and methods outlined hereinabove, or other related sensors, principles, procedures, and methods that produce the described result.

In step 626 the vehicle range maximization system 100 determines the estimated contribution of the carried mass to the vehicle's range 316a using the principles, procedures, and methods outlined hereinabove, or other related principles, procedures, and methods that produce the described result. The contribution of the carried mass may take the form of a percent of total energy consumption or fraction of total energy consumption attributable to carried mass, or may be expressed in terms of the actual energy or power requirement associated with the carried mass, alongside total energy consumption of the vehicle. Other ways of expressing the contribution are also contemplated.

In step 636, the range contribution of the carried mass is sent to the in-vehicle display 290, where it is visible to the vehicle operator and any interested passengers. The contribution of the carried mass to the vehicle's range will indicate both the severity of the issue and the potential value in modifying it.

In step 650, both the tire pressures and the carried mass are used to compute changes to drive train settings or parameters (aka engine parameters, motor parameters). The drive train settings or parameters may include but are not limited to fuel/air mixture ratios, gear shift mapping, and throttle or accelerator pedal mapping. Changes to the drive train settings or parameters may be small or zero, or they may be substantial, depending on the severity of range degradation and the mathematically determined range improvement that is available through the alteration of one or more settings or parameters.

In step 655, the drive train settings or parameters are sent to the drive train ECU 113, where they may alter the responses of the drive train in order to maximize, optimize, improve or otherwise modify the range of the vehicle. In an example, a heavier vehicle may make it advantageous for the vehicle to remain in a lower gear and increase throttle output.

In step 660, both the tire pressures and the carried mass are used to compute changes to chassis settings or parameters. The chassis settings or parameters may include but are not limited to ride height, stiffness, pre-load, and damping. Computed changes to the chassis parameters may be small or zero, or they may be substantial, depending on the severity of range degradation and the range improvement available through the alteration of one or more parameters.

In step 665, the chassis parameters are sent to the chassis ECU 111, where they may alter the responses of the drive train in order to maximize, optimize, improve or otherwise modify the range of the vehicle. In an example, underinflated tires may result in a softer ride which dissipates more energy as heat and noise, and also results in lower ground clearance and an increased response to road irregularities. In such a case, it may be advantageous to compensate for example by stiffening the suspension and raising the ride height.

In step 670, both the tire pressures and the carried mass are used to compute changes to brake parameters or braking parameters, including but not limited to stiffness, anti-lock thresholds, traction control thresholds, and brake pedal mapping. Changes to the brake parameters may be small or zero, or they may be substantial, depending on the severity of range degradation and the improvement available through the alteration of the parameters.

In step 675, the brake parameters are sent to the brake ECU 112, where they may alter the responses of the drive train in order to maximize or modify the range of the vehicle. For example, underinflated tires may result in greater overall traction for the vehicle, allowing braking response to be moderated by changing the brake pedal mapping.

In some cases, braking, chassis, and drive train parameters are user selectable as modes or packages, e.g., with buttons or menu options such as "Sport Mode", "Economy Mode", or "Traction Mode." In an example, it may be more effective or more convenient for the vehicle range maximization system 100 to engage such features rather than modifying individual parameters. For example, if the inflation of one or more tires falls below a threshold value, and/or the carried mass exceeds a threshold value, the vehicle range maximization system 100 may be configured to switch the vehicle automatically from "Sport Mode" or "Traction Mode" into "Economy Mode" or "All-Electric Mode."

Other modes, transitions, ECUs, subsystems, and parameter adjustments are contemplated and are within the scope of the present disclosure. The examples described for this figure are purely illustrative and do not impose limitations on the claimed subject matter.

Figure 7:
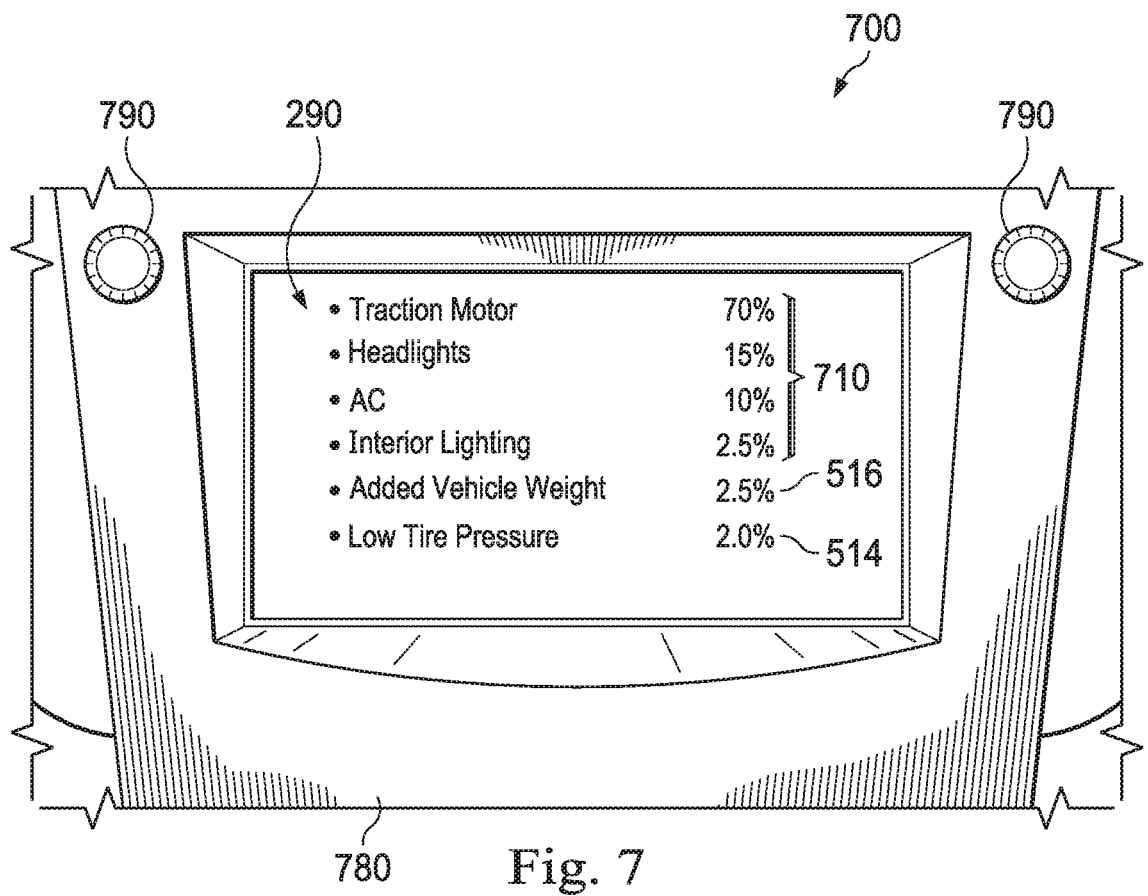
FIG. 7 is an example vehicle range maximization system display in accordance with at least one embodiment of the present disclosure.

FIG. 7 is an example vehicle range maximization system display 700 in accordance with at least one embodiment of the present disclosure. In the example shown in the figure, the vehicle range maximization system display 700 is visible on an in-vehicle display 290 in a dashboard console 780 with adjacent control knobs 790. However, the vehicle range maximization system display 700 could also be shown on other display screens, including but not limited to heads-up displays, augmented reality displays, or the displays of handheld, tablet, notebook, and wearable devices.

The vehicle range maximization system display 700 may include the power consumption contributions of internal components 710. In the example shown in the figure, these internal components are the traction motor (i.e., vehicle powerplant), headlights, air conditioning, and interior lighting. Next to each component is its percent contribution 720. In this example, turning off the traction motor is not feasible, but the vehicle operator could reduce power consumption (and therefore increase range) by 27.5% by turning off the headlights, air conditioning, and interior lighting.

However, a particularly novel feature of the vehicle range maximization system display 700 is the inclusion of external or extrinsic factors on the power consumption list: the added weight contribution 516 and low tire pressure contribution 514. "Added vehicle weight" and "low tire pressure" are not internal components that can be switched on and off by the vehicle operator, and their contributions to energy consumption can't simply be measured, but must be computed through a series of complex steps. However, in this example, the vehicle range maximization system display 700 is configured to display them, and these values indicate that stopping the vehicle and removing some or all of the added vehicle weight (e.g., by brushing off snow and ice and throwing away trash) could yield an energy savings (and therefore a range improvement) of up to 2.5%, while inflating the tires to factory-recommended pressure could yield up to 2.0%, for a total available range increase of 4.5%. Given the prevalence of "range anxiety", such information is extremely beneficial to vehicle operators in maximizing their ability to complete tasks, errands, and journeys in between rechargings or refuelings.

In a different use case, a delivery driver may use the "added vehicle weight" contribution to estimate the costs of a trip that are specifically attributable to the cargo itself, or a car service may be able to adjust its fares accurately, based on the total mass of passengers and baggage they are hauling. In still another use case, the system can be used to alert the driver if the vehicle is dangerously overloaded. A heavier vehicle may take more time to stop, may affect safety of cornering, stress chassis parts, etc. Comments on how the driver can improve the range by removing/reducing mass inside or on the vehicle or by altering tire inflation may also be shared on the in-vehicle display 290.

Once added vehicle mass is removed and/or tire pressure is increased the indication of the percent contribution to the range based on the added mass and/or the tire pressure will either update or (if zero) disappear completely from the display. It is noted that this exemplary 2.5% for added mass and 2.0% for tire pressure take into account the chassis, brake, and drive train optimizations that are engaged while the excess mass and low tire pressure are present. It should be understood that if such optimizations were not engaged, the available energy savings (and therefore range improvements) would be larger. In some embodiments, the vehicle range maximization system 100 includes an on/off switch or reconfigurable menu selection that disables all features simultaneously. Disabling some features while leaving others operational is also possible, though it may be more complex. In an example, when the vehicle range maximization system 100 is disabled, calculations and operations may proceed as shown in FIG. 3, and when the vehicle range maximization system 100 is enabled, calculations and operations may proceed as shown in FIGS. 4-7.

A number of variations are possible on the examples and embodiments described above. For example, the display 290 could be replaced or supplemented with audible warnings, messages, flashing lights or indicators, data, and recommendations, or with haptic feedback (e.g., steering wheel vibration). The technology described herein may be implemented on manually controlled vehicles, driver-assist vehicles, or fully autonomous vehicles. The technology described herein may be implemented in diverse combinations of hardware, software, and firmware, depending on the implementation or as necessitated by the structures and modules already present in existing vehicles.

Accordingly, the logical operations making up the embodiments of the technology described herein may be referred to variously as operations, steps, objects, elements, components, or modules. Furthermore, it should be understood that components or steps may be arranged in any order, unless explicitly claimed otherwise or a specific order is inherently necessitated by the claim language or by the nature of the component or step.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the vehicle range maximization system. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the Vehicle range maximization system as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter. For example, additional sensor such as passenger weight sensors and cargo compartment weight sensors may be employed if available. Additionally, sensors external to the vehicle may be employed to provide or supplement any of the sensor data described hereinabove. Alternatively, machine learning algorithms or other AI systems may be used to estimate variables from sparse, noisy, or entwined data streams without departing from the spirit of the present disclosure. The principles described above can be equally applied to internal combustion vehicles by a person of ordinary skill in the art, wherein the energy storage device is a fuel tank rather than an electric battery, and the remaining range until stored energy depletion is the range until fuel depletion rather than battery depletion.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A range maximization system for a vehicle accounting for external factors, comprising:
a tire pressure sensor disposed about the vehicle configured to detect a tire pressure of the vehicle;
a load carry sensor disposed about the vehicle configured to detect information relevant to a load on the vehicle;
a vehicle control unit configured to receive detected information from the tire pressure and load carry sensor, and configured to determine a) an expected range for the vehicle with the detected information relevant to the load and the detected tire pressure, b) a contribution of the detected information relevant to the load and the detected tire pressure to the vehicle range, and c) braking parameters, chassis parameters, and engine parameters that maximize vehicle range based on the load and tire pressure; and
a display configured to display the contribution of the detected load and the detected tire pressure to the vehicle range.

2. The system of claim 1, comprising:
a brake electronic control unit configured to control one or more brakes of the vehicle based on the braking parameters;
a chassis electronic control unit configured to control one or more chassis elements of the vehicle based on the chassis parameters; and
an engine electronic control unit configured to control one or more engine elements of the vehicle based on the engine parameters.

3. The system of claim 1, wherein the tire pressure sensor comprises a plurality of tire pressure sensors that each separately detect a tire pressure of each wheel of the vehicle.

4. The system of claim 1, wherein the load carry sensor configured to detect information relevant to the load on the vehicle comprises one or more of:
one or more load cells located in seats of the vehicle;
one or more load cells located in cargo areas of the vehicle;
one or more load cells located in roof racks of the vehicle;
one or more weight sensors disposed about a chassis of the vehicle;
one or more ride height sensors disposed about the chassis of the vehicle;
one or more accelerometers;
one or more inclinometers; and
a mapping unit capable of determining a road grade.

5. The system of claim 1, wherein the braking parameters comprise at least one of stiffness, anti-lock thresholds, traction control thresholds, and brake pedal mapping.

6. The system of claim 1, wherein the chassis parameters comprise at least one of ride height, stiffness, pre-load, and damping.

7. The system of claim 6, wherein the chassis parameters are determined separately for each wheel of the vehicle.

8. The system of claim 1, wherein the engine parameters comprise at least one of fuel/air mixture ratios, gear shift mapping, and throttle or accelerator pedal mapping.

9. The system of claim 1, wherein at least one of the tire pressure sensor and the load carry sensor generate one or more of histories, time averages, integrals, first derivatives, or filters of some or all of the detected information from the tire pressure sensor and load carry sensor.

\* \* \* \* \*